United States Patent
Ikeda et al.

(10) Patent No.: US 10,997,743 B2
(45) Date of Patent: May 4, 2021

(54) ATTACHABLE MATTER DETECTION APPARATUS

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 40 days.

(21) Appl. No.: 16/703,958

(22) Filed: Dec. 5, 2019

(65) Prior Publication Data

US 2020/0219280 A1 Jul. 9, 2020

(30) Foreign Application Priority Data

Jan. 7, 2019 (JP) .............................. JP2019-000793

(51) Int. Cl.
| | | |
|---|---|---|
| *G06K 9/00* | (2006.01) | |
| *G06T 7/70* | (2017.01) | |
| *G06T 7/13* | (2017.01) | |

(52) U.S. Cl.
CPC . *G06T 7/70* (2017.01); *G06T 7/13* (2017.01)

(58) Field of Classification Search
None
See application file for complete search history.

(56) References Cited

U.S. PATENT DOCUMENTS

| 2014/0010408 A1* | 1/2014 | Irie ..................... G06T 7/0002 |
| | | 382/103 |
| 2015/0002672 A1* | 1/2015 | Hayakawa ......... G06K 9/00791 |
| | | 348/148 |
| 2015/0324651 A1* | 11/2015 | Fukata ............... G06K 9/00805 |
| | | 348/148 |
| 2020/0210740 A1* | 7/2020 | Ikeda ................. G06K 9/00791 |

FOREIGN PATENT DOCUMENTS

| JP | 2012-038048 A | 2/2012 |
| JP | 2014-030188 A | 2/2014 |
| JP | 2018-072312 A | 5/2018 |

* cited by examiner

*Primary Examiner* — Hadi Akhavannik
(74) *Attorney, Agent, or Firm* — Oliff PLC

(57) ABSTRACT

A decision part decides a representative edge direction using a predetermined angle range as a unit for each pixel area of a plurality of pixel areas of a photographic image photographed by a camera based on an edge angle of each pixel contained in the pixel area. An extractor extracts two of the pixel areas that are adjacent to each other as a pair area among the pixel areas of the photographic image, when the two pixel areas that are adjacent to each other have opposite representative edge directions. A determination part determines whether or not there is an attachable matter on a lens of the camera based on at least one of (1) a number of the pair areas extracted by the extractor and (2) a total sum of edge intensities of the pixel areas contained in the pair areas.

6 Claims, 8 Drawing Sheets

ATTACHABLE MATTER DETECTION APPARATUS

BACKGROUND OF THE INVENTION

Field of the Invention

The invention relates to an attachable matter detection apparatus and an attachable matter detection method.

Description of the Background Art

Conventionally, there is known an attachable matter detection apparatus that detects an attachable matter attached to a lens of a camera based on a photographic image photographed by the camera mounted on a vehicle, or the like. The attachable matter detection apparatus detects an attachable matter, for example, based on a difference between time-series photographic images.

SUMMARY OF THE INVENTION

According to one aspect of the invention, an attachable matter detection apparatus includes a controller configured to function as a decision part, an extractor and a determination part. The decision part decides a representative edge direction using a predetermined angle range as a unit for each pixel area of a plurality of pixel areas of a photographic image photographed by a camera. The representative edge direction is determined for each of the pixel areas based on an edge angle of each pixel contained in the pixel area. The extractor extracts two of the pixel areas that are adjacent to each other as a pair area among the pixel areas of the photographic image, when the two pixel areas that are adjacent to each other have opposite representative edge directions. The determination part determines whether or not there is an attachable matter on a lens of the camera based on at least one of (1) a number of the pair areas extracted by the extractor and (2) a total sum of edge intensities of the pixel areas contained in the pair areas.

As a result, it is possible to detect an attachable matter early and with high accuracy.

Therefore, an object of the invention is to provide an attachable matter detection apparatus and an attachable matter detection method capable of detecting an attachable matter early and with high accuracy.

These and other objects, features, aspects and advantages of the invention will become more apparent from the following detailed description of the invention when taken in conjunction with the accompanying drawings.

DESCRIPTION OF THE EMBODIMENTS

An attachable matter detection apparatus and an attachable matter detection method according to an embodiment of the present application will now be described in detail with reference to the accompanying drawings. The present disclosure is not limited to the embodiment described in the following.

Figure 1:
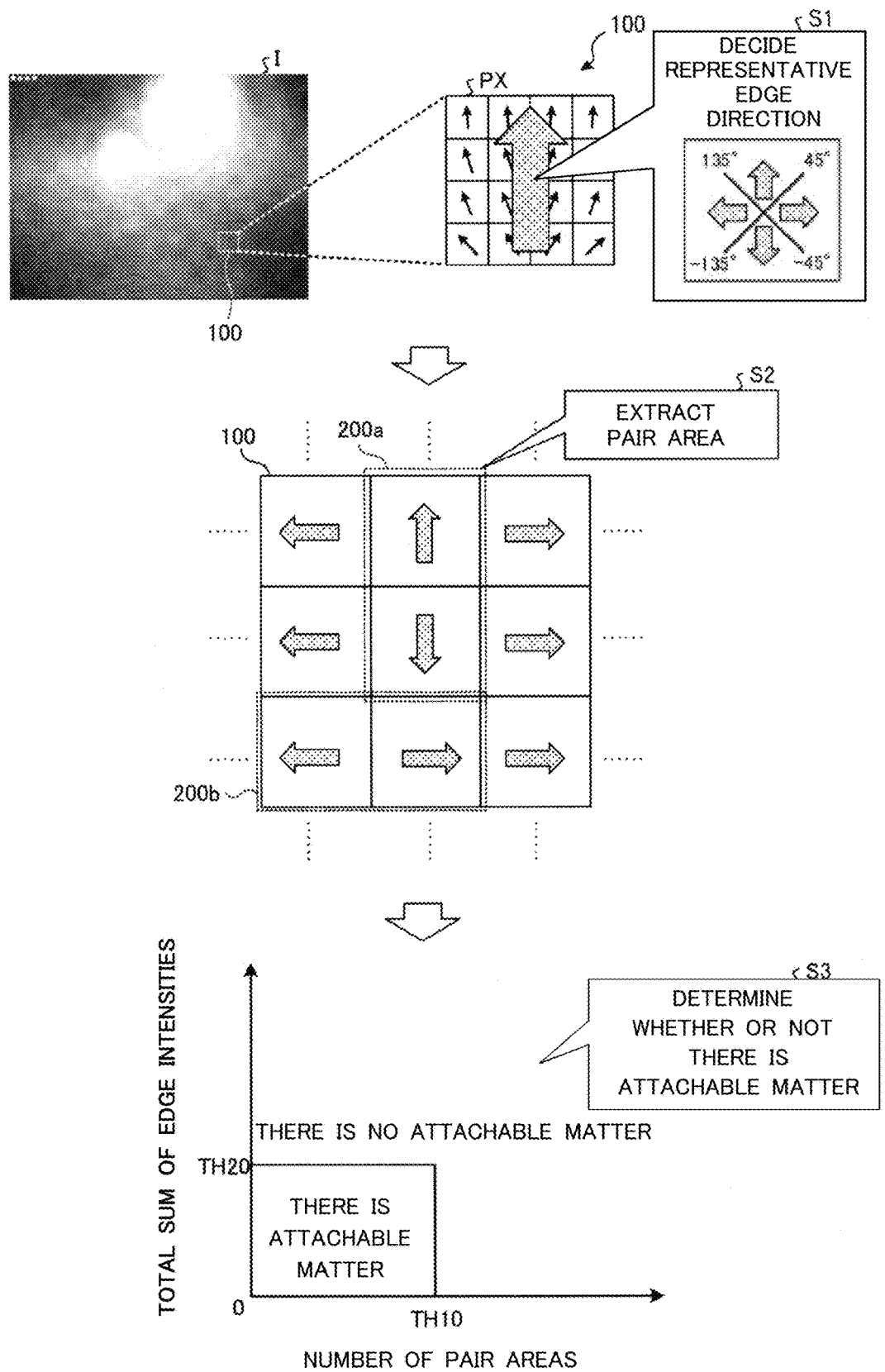
FIG. 1 illustrates an overview of an attachable matter detection method according to an embodiment.

First, an overview of the attachable matter detection method according to the embodiment will be described with reference to FIG. 1. FIG. 1 illustrates the overview of the attachable matter detection method according to the embodiment. FIG. 1 shows a photographic image I photographed, for example, in a state in which snow is attached on an entire surface of a lens of an in-vehicle camera. The attachable matter detection method according to the embodiment is executed by an attachable matter detection apparatus 1 (refer to FIG. 2), and detects an attachable matter attached to the lens of the in-vehicle camera based on the photographic image I photographed by the in-vehicle camera.

The attachable matter is not limited to snow, and may be, for example, light-colored dirt, or the like. In other words, although, in the photographic image I, the attachable matter prevents an object from being reflected, some light may transmit through the attachable matter and a small luminance change may be caused by a light transmission variation.

Here, in a conventional attachable matter detection apparatus, there is a technology that detects an attachable matter based on a difference between times-series photographic images. However, in the conventional technology, for example, if the entire lens is covered with snow, or the like, the difference between the images is hardly caused so that there is a possibility that an attachable matter cannot be detected. Conventionally, in a photographic image covered with snow, for example, when a vehicle travels in a tunnel, a part of the photographic image I temporarily has high luminance due to a light source in the tunnel. In this case, since an intensity of an edge increases in an area of high luminance due to a light source, erroneous detection of a state in which there is no attachable matter may be performed. Furthermore, conventionally, since times-series photographic images are required, it takes times to detect an attachable matter.

Therefore, in the attachable matter detection method according to the embodiment, an attachable matter is detected using an edge angle that is detected from a single photographic image I. Specifically, as illustrated in FIG. 1, the attachable matter detection apparatus 1 according to the embodiment first decides a representative edge direction using a predetermined angle range as a unit and an edge intensity for each pixel area 100 based on the edge angle (a vector direction within each pixel PX in FIG. 1) of each pixel PX contained in the pixel area 100 of the photographic image I (a step S1).

For example, the pixel area 100 is an area in which the pixels PX are arranged in a 4×4 matrix (16 pixels PX in total). In FIG. 1, for convenient description purposes, only a single pixel area 100 is shown, but actually, in the entire photographic image I (or a part of the photographic image I in which an attachable matter is detected), a plurality of the pixel areas 100 is set in a two-dimensional (vertical and horizontal) array. A setting range of the pixel areas 100 may be the entire photographic image I or a center area obtained by excluding a vehicle body area from the photographic image I.

The representative edge direction is an edge direction representing the respective edge angles of 4×4 pixels PX. In FIG. 1, the representative edge direction is divided into four directions by each angle range of 90°, and one of the four representative edge directions is decided. The edge intensity is an edge intensity representing the respective edge intensities of 4×4 pixels. A decision process of the representative edge direction and edge intensity will be described below with reference to FIG. 3 and FIG. 4.

Subsequently, in the attachable matter detection method according to the embodiment, among the pixel areas 100, when two pixel areas 100 adjacent to each other have opposite representative edge directions, the two pixel areas 100 adjacent to each other are extracted as a pair area 200 (a step S2).

In the example of FIG. 1, a pair area 200a in which two pixel areas 100 are adjacent to each other in a vertical direction and a pair area 200b in which two pixel areas 100 are adjacent to each other in a horizontal direction are shown. An extraction process of the pair area 200a and the pair area 200b will be described below. If the pair area 200a is not particularly distinguished from the pair area 200b, the pair area 200 obtained by deleting the last digit is described.

Subsequently, in the attachable matter detection method according to the embodiment, it is determined whether or not there is an attachable matter on the lens based on at least one of a number of the extracted pair areas 200 and a total sum of the edge intensities of the pixel areas 100 contained in the pair area 200 (a step S3).

The number of the pair areas 200 refers to a total value obtained by adding the number of the pair areas 200a each in which two pixel areas 100 are adjacent to each other in the vertical direction to the number of the pair areas 200b each in which two pixel areas 100 are adjacent to each other in the horizontal direction. The total sum of the edge intensities of the pixel areas 100 in the pair areas 200 refers to a total value obtained by adding up the edge intensities of all of the pixel areas 100 contained in the pair areas 200. Calculation methods of the number of the pair areas 200 and the total sum of the edge intensities will be described below with reference to FIG. 5 and FIG. 6.

For example, when there is no attachable matter, a relatively large number of the pair areas 200 are extracted due to a white line on the road, a building outline, etc. Furthermore, since the edge intensities of the pixel areas 100 are high, the total sum of the edge intensities of the pixel areas 100 in the pair areas 200 relatively increases. On the other hand, when the entire lens is covered with an attachable matter, since the luminance of the photographic image I is totally uniform and the edge intensities of the pixel areas 100 decrease, both the number of the pair areas 200 to be extracted and the total sum of the edge intensities of the pixel areas 100 in the pair areas 200 relatively decrease.

Therefore, by focusing on this point, as illustrated in FIG. 1, in the attachable matter detection method according to the embodiment, when the number of the pair areas 200 is equal to or more than a predetermined threshold value TH10, and the total sum of the edge intensities is equal to or more than a predetermined threshold value TH20, it is determined that there is no attachable matter on the lens (a non-attached state). On the other hand, in the attachable matter detection method according to the embodiment, when the number of the pair areas 200 is less than the predetermined threshold value TH10, and the total sum of the edge intensities is less than the predetermined threshold value TH20, it is determined that there is an attachable matter on the lens.

In the attachable matter detection method according to the embodiment, it may be further determined whether an attachable matter is attached partially on the lens or attached on the entire lens. However, this will be described in detail below with reference to FIG. 5.

As described above, in the attachable matter detection method according to the embodiment, by detecting an attachable matter based on the number of the pair areas 200 or the total sum of the edge intensities, even when the difference between the images is not caused, it is possible to detect an attachable matter with high accuracy. For example, even when a part of the photographic image I temporarily has high luminance due to a light source in the tunnel, and the like, a change in the number of the pair areas 200 and the total sum of the edge intensities is totally minute. As a result, it is possible to reduce erroneous detection of a state in which there is no attachable matter despite the fact there is an attachable matter. Furthermore, in the attachable matter detection method according to the embodiment, it is possible to detect an attachable matter using a single photographic image I. Therefore, according to the attachable matter detection method according to the embodiment, it is possible to detect an attachable matter early and with high accuracy.

FIG. 1 illustrates a case where a single type of representative edge direction is decided for each pixel area 100, but, for example, by further deciding representative edge directions having different angle ranges, two or more types of representative edge directions may be decided for each pixel area 100. A case where two types of representative edge directions are decided will be described below with reference to FIG. 9.

FIG. 1 illustrates a case where it is determined whether or not there is an attachable matter based on the number of the pair areas 200 (predetermined threshold value TH10) or the total sum of the edge intensities (predetermined threshold value TH20). For example, on a two-dimensional map represented by the number of the pair areas 200 and the total sum of the edge intensities, map information in which areas for determining whether "there is an attachable matter" or "there is no attachable matter" are set may be created in advance and it may be determined whether or not there is an attachable matter based such map information.

Figure 2:
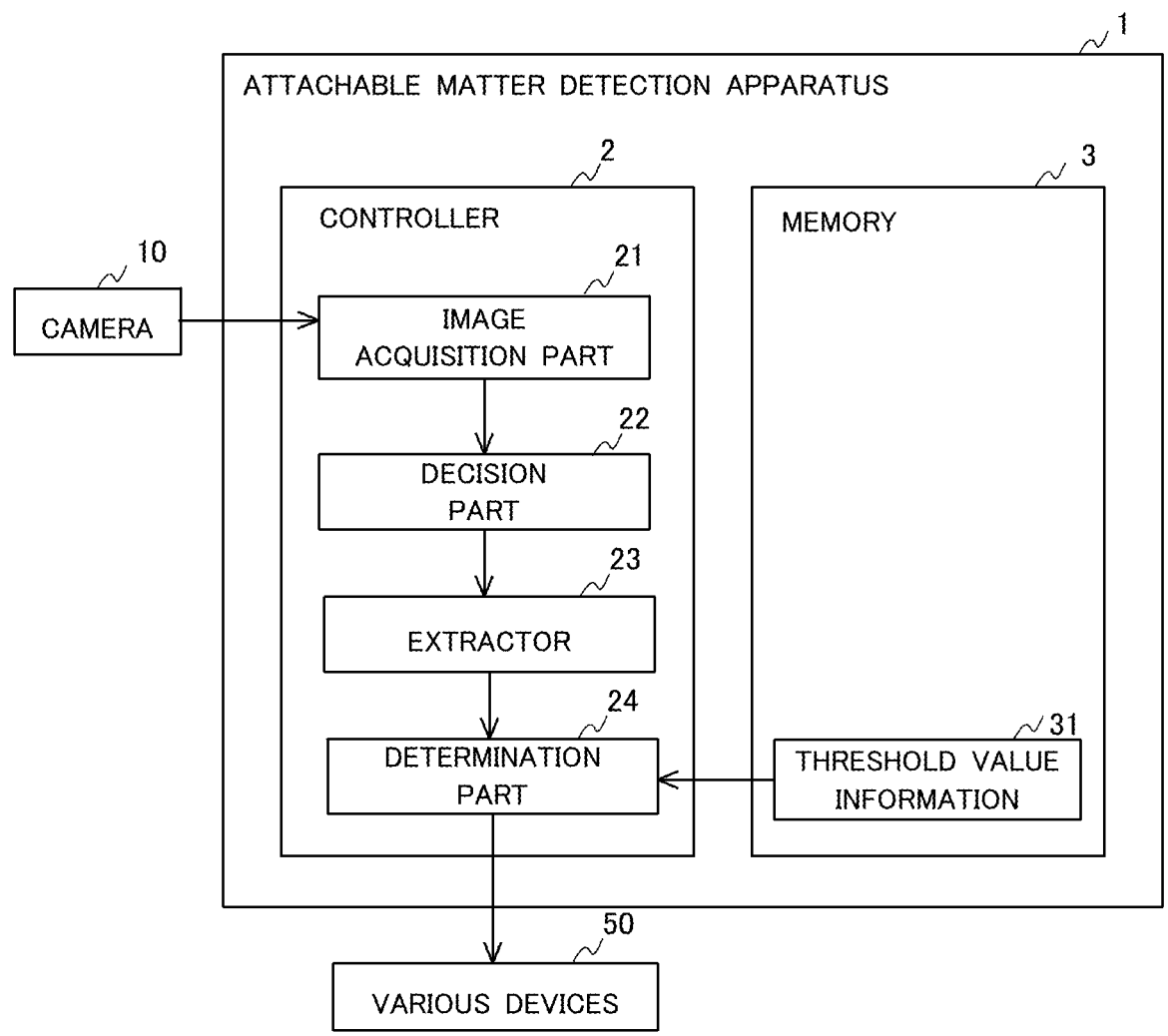
FIG. 2 is a block diagram illustrating a configuration of an attachable matter detection apparatus according to the embodiment.

Next, a configuration of the attachable matter detection apparatus 1 according to the embodiment will be described with reference to FIG. 2. FIG. 2 is a block diagram illustrating the configuration of the attachable matter detection apparatus 1 according to the embodiment. As illustrated in FIG. 2, the attachable matter detection apparatus 1 according to the embodiment is connected to a camera 10 and various devices 50. FIG. 2 illustrates a case where the attachable matter detection apparatus 1 is configured separately from the camera 10 and the various devices 50. However, the invention is not limited thereto. The attachable matter detection apparatus 1 may be configured integrally with at least one of the camera 10 and the various devices 50.

The camera 10 is, for example, an in-vehicle camera including a lens, such as a fish-eye lens, and an image sensor, such as a charge coupled device (CCD) or a complementary metal oxide semiconductor (CMOS). The camera 10 is, for example, provided at each position capable of photographing front, rear and side images of a vehicle, and outputs the photographed photographic image I to the attachable matter detection apparatus 1.

The various devices 50 acquire a detection result of the attachable matter detection apparatus 1 and perform various control of the vehicle. The various devices 50 include, for example, a display that notifies a user that an attachable matter is attached on the lens of the camera 10 and instructs the user to remove the attachable matter from the lens, a remover that removes the attachable matter by spraying a fluid, air, etc. to the lens, and a vehicle control device that controls autonomous driving, and the like.

As illustrated in FIG. 2, the attachable matter detection apparatus 1 according to the embodiment includes a controller 2 and a memory 3. The controller 2 includes an image acquisition part 21, a decision part 22, an extractor 23, and a determination part 24. The memory 3 stores threshold value information 31.

Here, the attachable matter detection apparatus 1 includes a computer having, for example, a central processing unit (CPU), a read only memory (ROM), a random access memory (RAM), a data flash, an input/output port, and the like, and various circuits.

The CPU of the computer serves as the image acquisition part 21, the decision part 22, the extractor 23, and the determination part 24 of the controller 2, for example, by reading and executing a program stored in the ROM.

At least any one or all of the image acquisition part 21 the decision part 22, the extractor 23, and the determination part 24 of the controller 2 may be configured of hardware such as an application specific integrated circuit (ASIC) or a field programmable gate array (FPGA).

The memory 3 corresponds to, for example, the RAM or data flash. The RAM or data flash may store the threshold value information 31, or information on various programs. The attachable matter detection apparatus 1 may acquire the programs or information described above via computers connected via a wired or wireless network or a portable recoding medium.

The controller 2 decides the representative edge direction for each pixel area 100 of the photographic image I and determines whether or not there is an attachable matter based on the number of the pair areas 200 each in which two pixel areas 100 adjacent to each other have opposite representative edge directions, and the total sum of the edge intensities of the pixel areas 100 contained in the pair areas 200.

The image acquisition part 21 acquires the photographic image I photographed by the camera 10. The image acquisition part 21 performs a grayscale conversion of expressing each pixel of the acquired photographic image I in gray scales from white to black depending on the luminance, performs a smoothing process on each pixel, and outputs the processed pixel to the decision part 22. For example, an averaging filter or an arbitrary smoothing filter, such as a Gaussian filter, may be used for the smoothing process. The grayscale conversion and the smoothing process may be omitted.

The decision part 22 decides the representative edge direction for each pixel area 100 of the photographic image I acquired from the image acquisition part 21. Here, the decision process of the representative edge direction by the decision part 22 will be specifically described with reference to FIG. 3 and FIG. 4.

Figure 3:
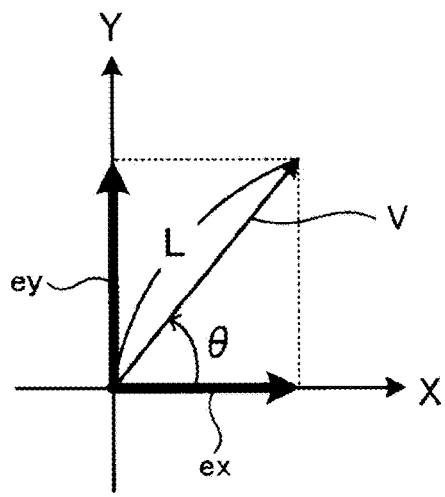
FIG. 3 illustrates a process of a decision part.
Figure 4:
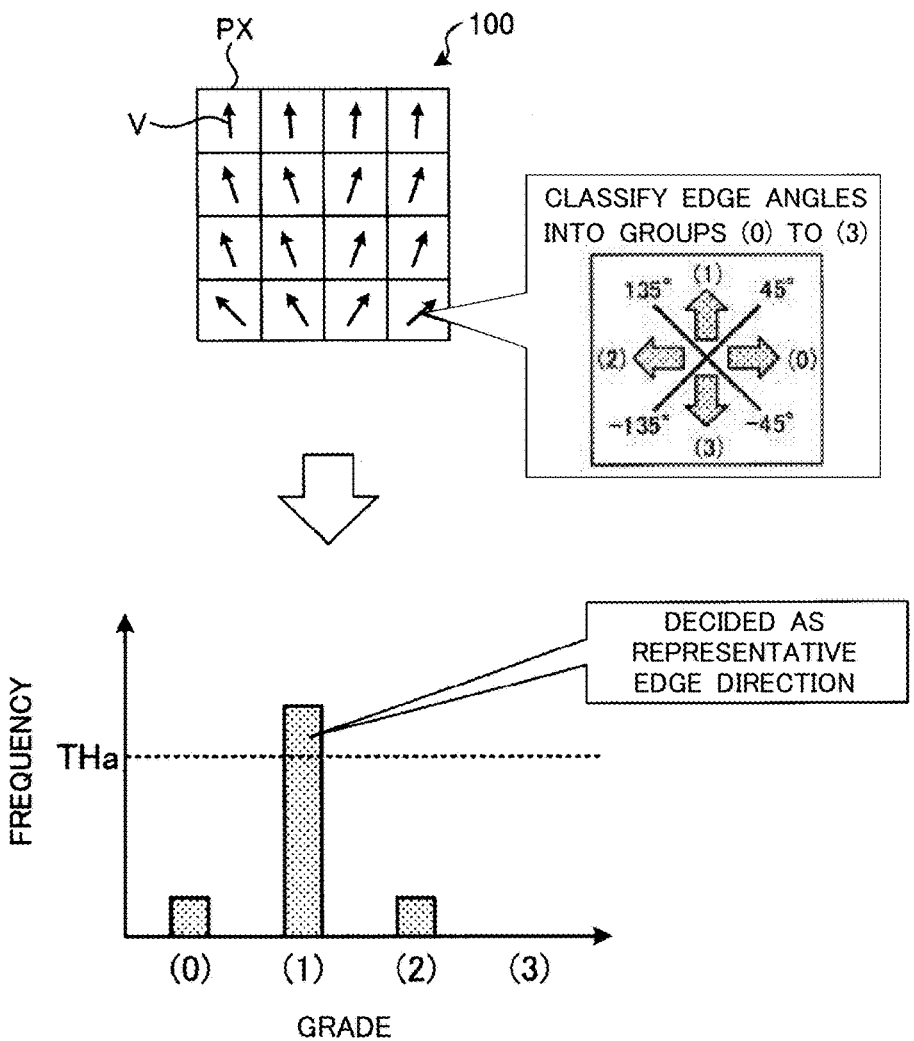
FIG. 4 illustrates a process of the decision part.

FIG. 3 and FIG. 4 illustrate a process of the decision part 22. As illustrated in FIG. 3, the decision part 22 first performs an edge detection process to detect an intensity of an edge ex in the X-axis direction (horizontal direction of the photographic image I) and an intensity of an edge ey in the Y-axis direction (vertical direction of the photographic image I). For example, a Sobel filter or an arbitrary edge detection filter such as a Prewitt filter may be used for the edge detection process.

Subsequently, the decision part 22 calculates a vector V including information of the edge angle and the edge intensity of each pixel PX using a trigonometric function based on the detected edge intensity of the edge ex in the X-axis direction and the detected edge intensity of the edge ey in the Y-axis direction. Specifically, an angle θ between the vector V and the X-axis on the positive direction side will be referred to as an edge angle, and the length L of the vector will be referred to as an edge intensity of each pixel.

Subsequently, the decision part 22 decides the representative edge direction in the pixel area 100 based on the calculated vector V of each pixel PX. Specifically, as illustrated in FIG. 4, each pixel PX (having an angle range of −180° to 180°) is divided into four parts (each having an angle range of 90°), and the four parts (groups) are indicated by codes "(0)" to "(3)", respectively.

Specifically, when the edge angle in the vector V is within an angle range of −45° or more and less than 45°, the decision part 22 classifies the edge angle into the group "(0)". When the edge angle in the vector V is within an angle range of 45° or more and less than 135°, the decision part 22 classifies the edge angle into the group "(1)". When the edge angle in the vector V is within an angle range of 135° or more and less than 180° or within an angle range of −180° or more and less than −135°, the decision part 22 classifies the edge angle into the group "(2)". When the edge angle in the vector V is within an angle range of −135° or more and less than −45°, the decision part 22 classifies the edge angle into the group "(3)".

As illustrated in a lower stage of FIG. 4, the decision part 22 creates a histogram using each of the groups "(0)" to "(3)" as each of grades for each pixel area 100. When a frequency of a grade whose frequency is the highest in the created histogram is a predetermined threshold value THa or more, the decision part 22 decides the group corresponding to the grade (group "(1)" in FIG. 4) as the representative edge direction in the pixel area 100. That is, the decision process of the representative edge direction by the decision part 22 can be regarded as a process of encoding each pixel area 100.

The frequency of the histogram is calculated by adding up the edge intensities of the pixels PX which are classified into a same angle range among the pixels PX within the pixel area 100. Specifically, the frequency of the histogram that belongs to the group (grade) "(0)" will be considered. For example, there are three pixels PX which are classified into the group (grade) "(0)", and the edge intensities of the three pixels PX are 10, 20, and 30, respectively. In this case, the frequency of the histogram that belongs to the group (grade) "0" is calculated by the following equation: 10+20+30=60. The frequency of the histogram that belongs to the group (grade) "(1)", "(2)", or "(3)" is calculated in a similar manner.

Based on the calculated histogram, the decision part 22 decides the edge intensity. Specifically, when the frequency of the grade whose frequency is the highest in the histogram is the predetermined threshold value THa or more, the frequency corresponding to the grade is regarded as the edge intensity. That is, a decision process of a representative edge intensity by the decision part 22 can be regarded as a process of extracting a characteristic related to the edge intensity within the pixel area 100 corresponding to the representative edge direction.

On the other hand, when the frequency of the grade whose frequency is the highest is less than the predetermined threshold value THa, the decision part 22 regards the representative edge direction in the pixel area 100 as "invalid", in other words, "no representative edge direction". As a result, when there is a large variation in the edge angles of each pixel PX, it is possible to prevent an erroneous determination of a specific representative edge direction.

The decision process of the decision part 22 illustrated in FIG. 3 and FIG. 4 is merely one example, and the process may be arbitrary if the process can decide the representative edge direction. For example, a mean value of the edge angles of each pixel PX in the pixel area 100 is calculated to decide the representative edge direction in the angle range corresponding to the mean value.

FIG. 4 illustrates a case where a single pixel area 100 consists of 16 (4×4) pixels PX, but a number of the pixels PX in the pixel area 100 may be arbitrarily set and may be different in vertical and horizontal directions, such as 3×5 pixels.

Referring back to FIG. 2, the extractor 23 will be described. Among the pixel areas 100 of the photographic image I, when two pixel areas 100 adjacent to each other have opposite representative edge directions, the extractor 23 extracts the two pixel areas 100 which are adjacent to each other as the pair area 200.

Specifically, the extractor 23 scans a plurality of the pixel areas 100 of the photographic image I which are arranged in a two-dimensional (horizontal and vertical) array in horizontal and vertical directions, and searches for the pair area 200. That is, the extractor 23 extracts two pixel areas 100 adjacent to each other in the horizontal or vertical direction that is the scanning direction. The extractor 23 outputs information of the extracted pair area 200 to the determination part 24.

The determination part 24 determines whether or not there is an attachable matter on the lens based on at least one of the number of the pair areas 200 extracted by the extractor 23 and the total sum of the edge intensities of the pixel areas 100 contained in the pair areas 200. For example, the determination part 24 determines whether or not there is an attachable matter based on the threshold value information 31 stored in the memory 3.

Figure 5:
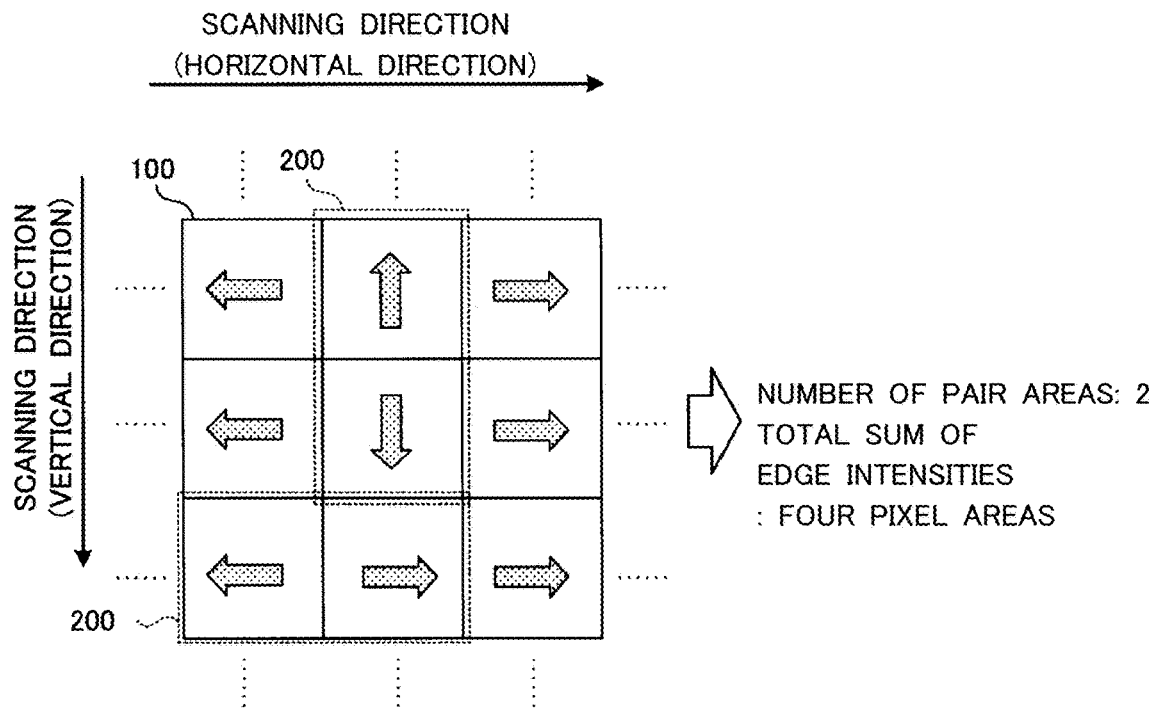
FIG. 5 illustrates a process of a determination part.
Figure 6:
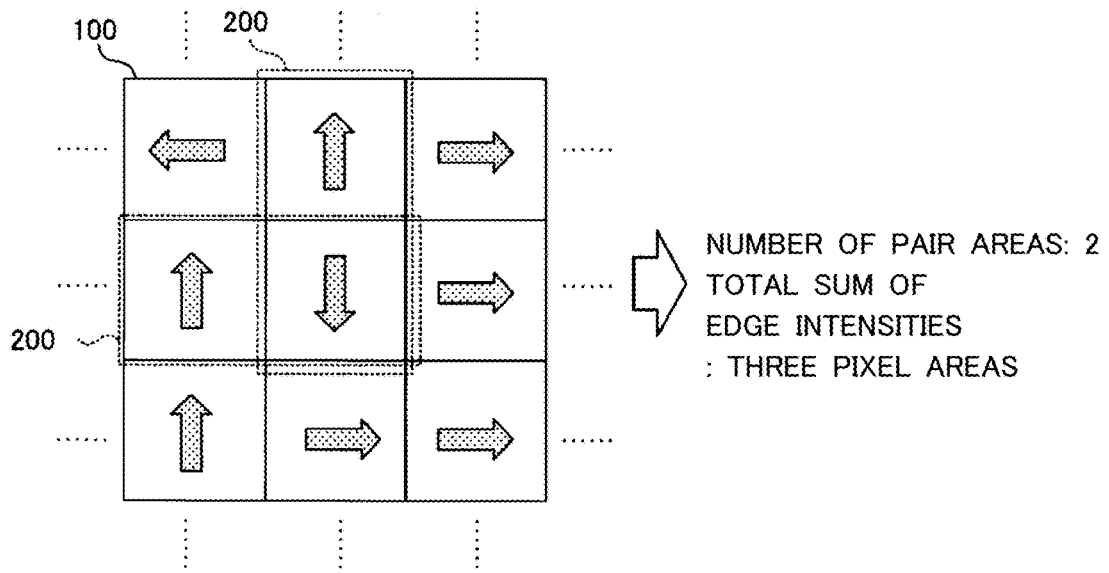
FIG. 6 illustrates a process of the determination part.
Figure 7:
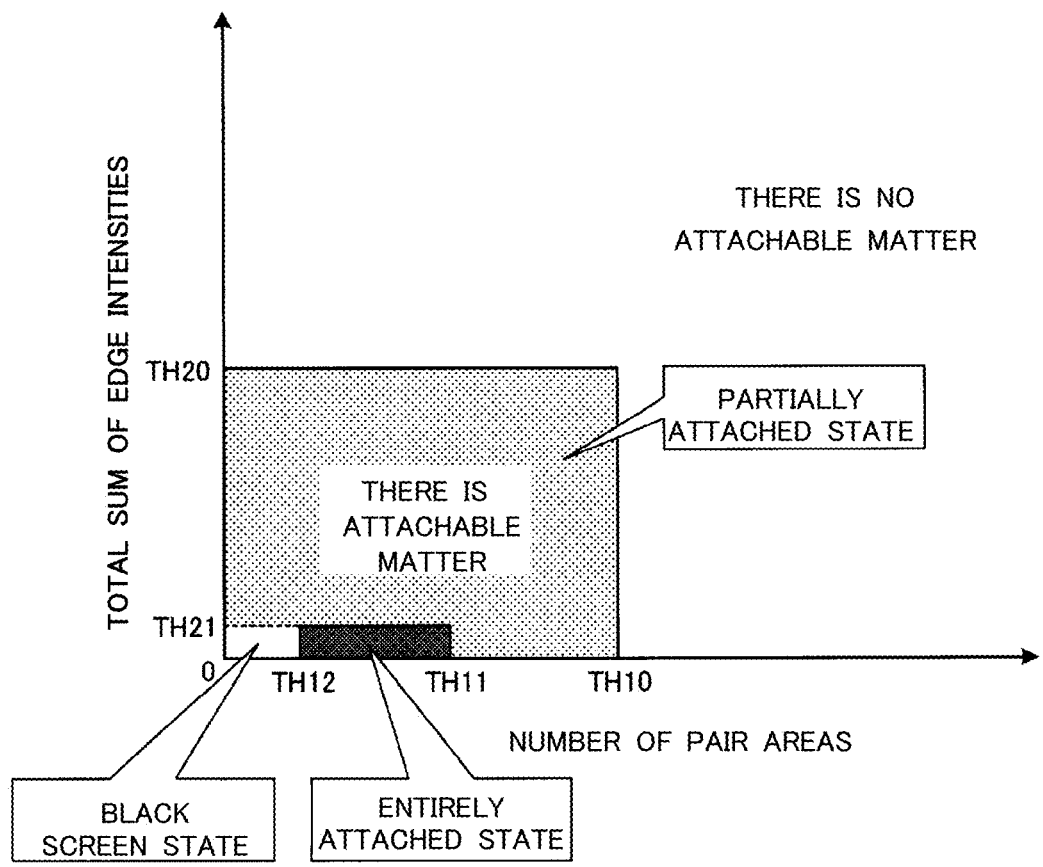
FIG. 7 illustrates a process of the determination part.

Here, a determination process of the determination part 24 will be specifically described with reference to FIG. 5 to FIG. 7. Each of FIG. 5 to FIG. 7 illustrates the determination process of the determination part 24. FIG. 5 and FIG. 6 illustrate the calculation methods of the number of the pair areas 200 and the total sum of the edge intensities. FIG. 7 illustrates the determination process using the calculated number of the pair areas 200 and the calculated total sum of the edge intensities.

FIG. 5 illustrates a case where there is no overlapping pixel area 100 between two pair areas 200. FIG. 6 illustrates a case where there is a single overlapping pixel area 100 between two pair areas 200. As illustrated in FIG. 5, when there is no overlapping pixel area 100 between the extracted two pair areas 200, the determination part 24 determines that the number of the pair areas 200 is two and the total sum of the edge intensities is a total value obtained by adding up the edge intensities of four pixel areas 100.

On the other hand, as illustrated in FIG. 6, when there is a single overlapping pixel area 100 between two pair areas 200, the determination part 24 determines that the number of the pair areas 200 is two and the total sum of the edge intensities is a total value obtained by adding up the edge intensities of the pixels PX contained in three pixel areas 100. That is, the determination part 24 does not regard an overlapping pixel area 100 as an independent pixel area 100 in each of the two pair areas 200, and calculates the total sum of the edge intensities assuming that the overlapping pixel area 100 is a single pixel area 100.

The determination part 24 may regard an overlapping pixel area 100 as an independent pixel area 100 in each of the two pair areas 200. That is, the determination part 24 may calculate the total sum of the edge intensities assuming that the overlapping pixel area 100 is two pixel areas 100. When there is a single overlapping pixel area 100 between two pair areas 200, the total sum of the edge intensities is obtained by adding up the edge intensities of four pixel areas 100.

As illustrated in FIG. 7, the determination part 24 determines whether or not there is an attachable matter based on whether or not the calculated number of the pair areas 200 and the total sum of the edge intensities of the pixel areas 100 contained in the pair areas 200 satisfy the predetermined threshold values. In FIG. 7, the predetermined threshold values TH10, TH11, TH12, TH20 and TH21 included in the threshold value information 31 are shown. The threshold value information 31 is made in advance, for example, by experiments.

Specifically, when the number of the pair areas 200 is equal to or more than the predetermined threshold value TH10 and the total sum of the edge intensities of the pixel areas 100 contained in the pair areas 200 is equal to or more than the predetermined threshold value TH20, the determination part 24 determines that a non-attached state exists in which there is no attachable matter on the lens ("there is no attachable matter" shown in FIG. 7). On the other hand, when the number of the pair areas 200 is less than the predetermined threshold value TH10 and the total sum of the edge intensities of the pixel areas 100 contained in the pair areas 200 is less than the predetermined threshold value TH20, the determination part 24 determines that there is an attachable matter on the lens.

That is, it is determined whether or not there is an attachable matter based on whether or not a lot of characteristics of a contour of an object such as a white line, a building, or the like are seen in the entire photographic image I. As a result, for example, even when a part of the photographic image I temporarily has high luminance due to a light source in the tunnel, and the like, a change in the number of the pair areas 200 obtained from the entire photographic image I and the total sum of the edge intensities is minute. Thus, it is possible to reduce erroneous detection of a state in which there is no attachable matter despite the fact there is an attachable matter.

As illustrated in FIG. 7, by setting the predetermined threshold values TH11, TH12 and TH21 different from the predetermined threshold values TH10, TH20, it is also possible to determine whether an attachable matter is attached partially on the lens or attached on the entire surface of the lens.

Specifically, when the number of the pair areas 200 is less than the predetermined threshold value TH10 and equal to or more than the predetermined threshold value TH11, and the total sum of the edge intensities of the pixel areas 100 contained in the pair areas 200 is less than the predetermined threshold value TH20 and equal to or more than the predetermined threshold value TH21, the determination part 24 determines that a partially attached state exists in which the attachable matter is attached partially on the lens.

On the other hand, when the number of the pair areas 200 is less than the predetermined threshold value TH11 and equal to or more than the predetermined threshold value TH12, and the total sum of the edge intensities of the pixel areas 100 contained in the pair area 200 is less than the predetermined threshold value TH21, the determination part 24 determines that an entirely attached state exists in which the attachable matter is attached on an entirety of the lens.

For example, in the photographic image I photographed in a state in which an attachable matter is attached on the entire lens, since an object does not have any contours and the luminance of the photographic image I is totally uniform, both the number of the pair areas 200 and the total sum of the edge intensities of the pixels PX contained in the pair areas 200 extremely decrease. On the other hand, in the photographic image I photographed in a state in which an attachable matter is attached partially on the lens, since an object has some slight contours and the luminance of the photographic image I is not totally uniform, both the number of the pair areas 200 and the total sum of the edge intensities of the pixel areas 100 contained in the pair areas 200 increase compared to the photographic image I photographed in the state in which an attachable matter is attached on the entire lens.

That is, the determination part 24 determines whether or not there is an attachable matter using image characteristics that appear depending on the attached state of an attachable matter on the lens. As a result, the determination part 24 can determine with high accuracy whether an attachable matter is attached partially on the lens or attached on the entire lens.

When the number of the pair areas 200 is less than the predetermined threshold value TH12, the determination part 24 determines that the photographic image I is totally in a black screen state. That is, when the number of the pair areas 200 is less than the predetermined threshold value TH12, the determination part 24 does not determine whether or not there is an attachable matter.

This is because the entire photographic image I temporarily becomes a black screen state by a user removing an attachable matter on the lens and it cannot be determined whether or not there is an attachable matter in the black screen. As described above, when the number of the pair areas 200 is less than the predetermined threshold value TH12, it is possible to prevent erroneous detection of an attachable matter by not performing the determination process of an attachable matter.

FIG. 7 illustrates an attachable matter determination in which both the number of the pair areas 200 and the total sum of the edge intensities of the pixel areas 100 contained in the pair areas 200 are used. However, the attachable matter determination may be performed using at least one of the number of the pair areas 200 and the total sum of the edge intensities of the pixel areas 100 contained in the pair areas 200.

Figure 8:
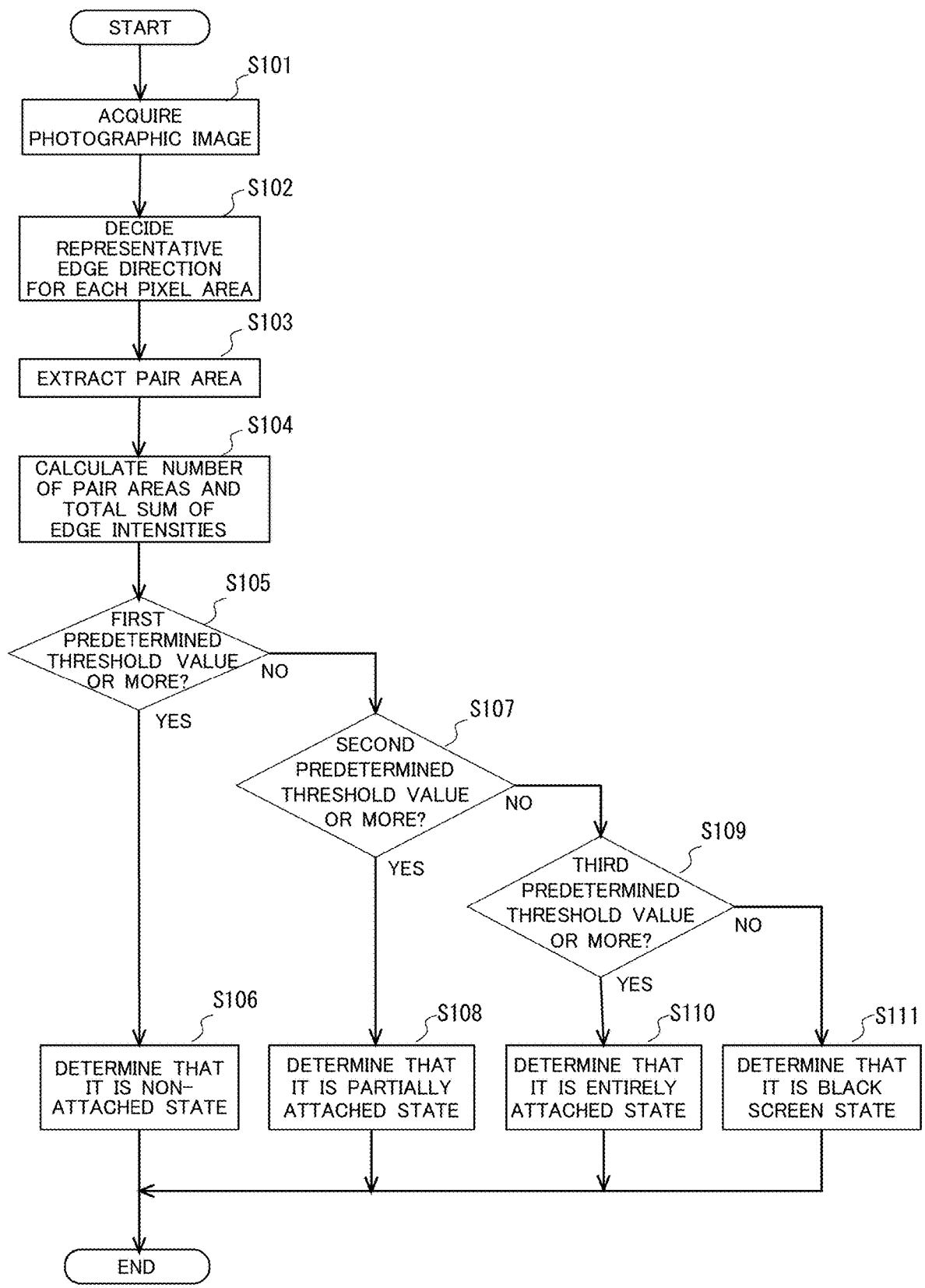
FIG. 8 is a flowchart illustrating a processing procedure of a detection process of an attachable matter executed by the attachable matter detection apparatus according to the embodiment.

Next, a processing procedure executed by the attachable matter detection apparatus 1 according to the embodiment will be described with reference to FIG. 8. FIG. 8 is a flowchart illustrating the processing procedure of a detection process of an attachable matter executed by the attachable matter detection apparatus 1 according to the embodiment.

As illustrated in FIG. 8, the image acquisition part 21 acquires the photographic image I, and performs a grayscale conversion and a smoothing process on the photographic image I (a step S101).

Subsequently, the decision part 22 decides the representative edge direction using a predetermined angle range as a unit for each pixel area 100 of a plurality of pixel areas 100 of the photographic image I photographed by the camera 10, and the representative edge direction is determined for each of the pixel areas based on an edge angle of each pixel PX contained in the pixel area 100 (a step S102).

Subsequently, among the pixel areas 100 of the photographic image I, when two of the pixel areas 100 that are adjacent to each other have opposite representative edge directions, the extractor 23 extracts the two pixel areas 100 that are adjacent to each other as the pair area 200 (a step S103).

Subsequently, the determination part 24 calculates the number of the pair areas 200 extracted by the extractor 23 and the total sum of the edge intensities of the pixel areas 100 contained in the pair areas 200 (a step S104). The determination part 24 may use at least one of the number of the pair areas 200 extracted by the extractor 23 and the total sum of the edge intensities of the pixel areas 100 contained in the pair areas 200 for the processes in steps S105 to S111.

Subsequently, the determination part 24 determines whether or not the number of the pair areas 200 is equal to or more than the predetermined threshold value TH10, and the total sum of the edge intensities of the pixel areas 100 contained in the pair areas 200 is equal to or more than the predetermined threshold value TH20 (the step S105).

When the number of the pair areas 200 is equal to or more than the predetermined threshold value TH10 and the total sum of the edge intensities of the pixel areas 100 contained in the pair areas 200 is equal to or more than the predetermined threshold value TH20 (Yes in the step S105), the determination part 24 determines that a non-attached state exists in which there is no attachable matter on the lens (the step S106), and ends the process.

On the other hand, when the number of the pair areas 200 is less than the predetermined threshold value TH10 and the total sum of the edge intensities of the pixel areas 100 contained in the pair areas 200 is less than the predetermined threshold value TH20 (No in the step S105), the determination part 24 determines whether or not the number of the pair areas 200 is equal to or more than the predetermined threshold value TH11 and the total sum of the edge intensities of the pixel areas 100 contained in the pair areas 200 is equal to or more than the predetermined threshold value TH21 (the step S107).

When the number of the pair areas 200 is equal to or more than the predetermined threshold value TH11 and the total sum of the edge intensities of the pixel areas 100 contained in the pair areas 200 is equal to or more than the predetermined threshold value TH21 (Yes in the step S107), the determination part 24 determines that a partially attached state exists in which the attachable matter is attached partially on the lens (the step S108), and ends the process.

On the other hand, when the number of the pair areas 200 is less than the predetermined threshold value TH11 and the total sum of the edge intensities of the pixel areas 100 contained in the pair areas 200 is less than the predetermined threshold value TH21 (No in the step S107), the determination part 24 determines whether or not the number of the pair areas 200 is equal to or more than the predetermined threshold value TH12 (the step S109).

When the number of the pair areas 200 is equal to or more than the predetermined threshold value TH12 (Yes in the step S109), the determination part 24 determines that an entirely attached state exists in which the attachable matter is attached on an entirety of the lens (the step S110), and ends the process.

On the other hand, when the number of the pair areas 200 is less than the predetermined threshold value TH12 (No in the step S109), the determination part 24 determines that the photographic image I is in a black screen state (the step S111), and ends the process.

As described above, the attachable matter detection apparatus 1 includes the decision part 22, the extractor 23, and the determination part 24. The decision part 22 decides the representative edge direction using a predetermined angle range as a unit for each pixel area 100 based on the edge angle of each pixel PX contained in the pixel area 100 of the photographic image I. Among the pixel areas 100 of the photographic image I, when two pixel areas 100 adjacent to each other have opposite representative edge directions, the extractor 23 extracts the two pixel areas 100 adjacent to each other as the pair area 200. The determination part 24 determines whether or not there is an attachable matter on the lens of the camera 10 based on at least one of the number of the pair areas 200 extracted by the extractor 23 and the total sum of the edge intensities of the pixel areas 100 contained in the pair areas 200. As a result, it is possible to detect an attachable matter early and with high accuracy.

In the embodiment described above, a single type of representative edge direction is decided for each pixel area 100, but two or more types of representative edge directions may be decided for each pixel area 100. This will be described with reference to FIG. 9 and FIG. 10.

Figure 9:
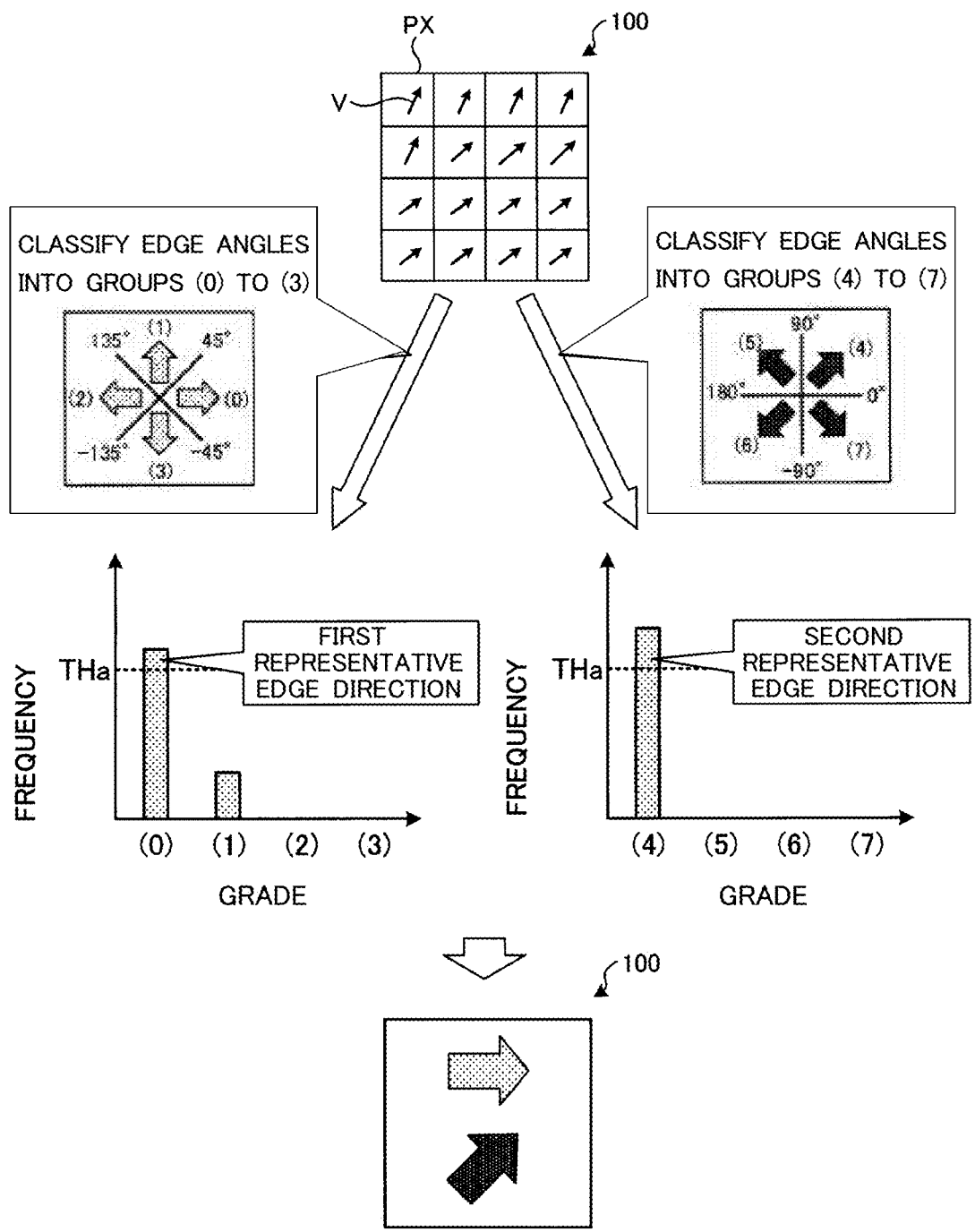
FIG. 9 illustrates a process of a decision part according to a modification.
Figure 10:
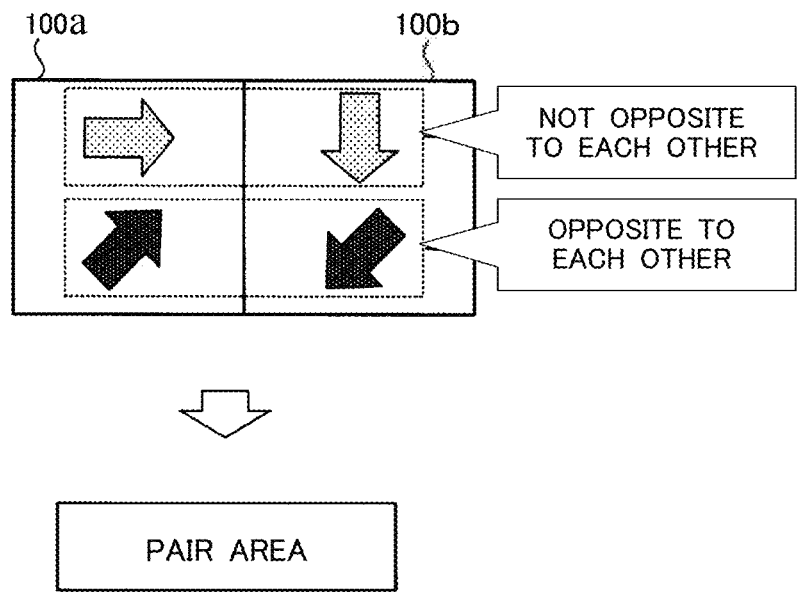
FIG. 10 illustrates a process of an extractor according to the modification.

FIG. 9 illustrates a process of a decision part 22 according to a modification. FIG. 10 illustrates a process of an extractor according to the modification. In FIG. 9 and FIG. 10, a process of deciding two types of representative edge directions having different angle ranges will be described.

As illustrated in FIG. 9, the decision part 22 decides a first representative edge direction using a first angle range as a unit for each of the pixel areas 100 and a second representative edge direction using a second angle range different from the first angle range as a unit for each of the pixel areas 100.

Specifically, the decision part 22 divides each pixel PX (having an angle range of −180° to 180°) into four parts (each having the first angle range of 90°), and the four parts (groups) are indicated by codes "(0)" to "(3)", respectively. Furthermore, the decision part 22 divides each pixel PX (having an angle range of −180° to 180°) into four parts (each having the second angle range of 90° different from the first angle range), and the four parts (groups) are indicated by codes "(4)" to "(7)", respectively.

More specifically, when an edge angle in a vector V is within an angle range of −45° or more and less than 45°, the decision part 22 classifies the edge angle into the group "(0)". When the edge angle in the vector V is within an angle range of 45° or more and less than 135°, the decision part 22 classifies the edge angle into the group "(1)". When the edge angle in the vector V is within an angle range of 135° or more and less than 180° or within an angle range of −180° or more and less than −135°, the decision part 22 classifies the edge angle into the group "(2)". When the edge angle in the vector V is within an angle range of −135° or more and less than −45°, the decision part 22 classifies the edge angle into the group "(3)"

Furthermore, when the edge angle in the vector V is within an angle range of 0° or more and less than 90°, the decision part 22 classifies the edge angle into the group "(4)". When the edge angle in the vector V is within an angle range of 90° or more and less than 180°, the decision part 22 classifies the edge angle into the group "(5)". When the edge angle in the vector V is within an angle range of 180° or more and less than −90°, the decision part 22 classifies the edge angle into the group "(6)". When the edge angle in the vector V is within an angle range of −90° or more and less than 0°, the decision part 22 classifies the edge angle into the group "(7)".

As illustrated in a lower stage of FIG. 9, the decision part 22 creates, for each pixel area 100, a histogram using each of the groups "(0)" to "(3)" as each of grades and a histogram using each of the groups "(4)" to "(7)" as each of grades. When a frequency of a grade whose frequency is the highest in the created histogram is a predetermined threshold value THa or more, the decision part 22 decides the group "(0)" corresponding to the grade as the first representative edge direction, and the decision part 22 decides the group "(4)" corresponding to the grade as the second representative edge direction.

As illustrated in FIG. 10, there are two pixel areas 100a and 100b which are adjacent to each other. As described above, the pixel area 100a has the first representative edge direction and the second representative edge direction decided by the decision part 22. Similarly, the pixel area 100b has the first representative edge direction and the second representative edge direction decided by the decision part 22. When at least one of the following conditions is met: (i) the respective first representative edge directions of the two pixel areas 100a and 100b are opposite to each other; and (ii) the respective second representative edge directions of the two pixel areas 100a and 100b are opposite each other, the extractor 23 extracts the two pixel areas 100a and 100b that are adjacent to each other as the pair area 200.

That is, for each pixel area 100, by deciding the first and second representative edge directions, it is possible to extract the pair area 200 which is not extracted only by a single type of representative edge direction.

For example, one pixel has an edge angle of 140° and the other pixel has an edge angle of −40°. Although the first representative edge directions of the two pixels are not opposite to each other, the second representative edge directions of the two pixels are opposite to each other. Thus, it is possible to detect a change in the edge angle of the pixel area 100 with higher accuracy.

In the embodiment and modification described above, in each pixel PX having an angle range of −180° to 180°, the representative edge direction is divided into four directions by each angle range of 90°. However, the angle range is not limited to 90°. For example, the representative edge direction may be divided into six directions by each angle range of 60°.

Widths of the respective angle ranges for the first representative edge direction and the second representative edge direction may be different from each other. For example, the first representative edge direction may be divided into four directions by each angle range of 90°, and the second representative edge direction may be divided into six directions by each angle range of 60°.

A boundary of two adjacent angle ranges for the first representative edge direction is deviated by an angle of 45° from a boundary of two adjacent ranges for the second representative edge direction. However, the deviated angle may exceed 45°, or may be less than 45°. It is possible to arbitrarily set the boundaries of two adjacent angle ranges for the first representative edge direction and the second representative edge direction.

In the embodiment described above, although the photographic image I photographed by the camera to be mounted on the vehicle is used, the photographic image I photographed by a security camera or a camera on a street light may be used. That is, the photographic image I photographed by a camera with a lens to which an attachable matter can be attached may be used.

In the embodiment described above, although the determination part 24 determines whether or not there is an attachable matter based on the predetermined threshold values TH10 and TH20, for example, detection of an attachable matter may be performed by totally comprehending a detection result of the attachable matter by other algorithms and a determination result by the determination part 24. Specifically, other algorithms determine that there is an attachable matter, and the determination part 24 according to the embodiment may determine that there is no attachable matter after the attachable matter is, for example, removed.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An attachable matter detection apparatus comprising a controller configured to function as:
    a decision part that decides a representative edge direction using a predetermined angle range as a unit for each pixel area of a plurality of pixel areas of a photographic image photographed by a camera, the representative edge direction being determined for each of the pixel areas based on an edge angle of each pixel contained in the pixel area;
    an extractor that extracts two of the pixel areas that are adjacent to each other as a pair area among the pixel areas of the photographic image, when the two pixel areas that are adjacent to each other have opposite representative edge directions; and
    a determination part that determines whether or not there is an attachable matter on a lens of the camera based on at least one of (1) a number of the pair areas extracted by the extractor and (2) a total sum of edge intensities of the pixel areas contained in the pair areas.

2. The attachable matter detection apparatus according to claim 1, wherein
    the determination part determines that a non-attached state exists in which there is no attachable matter on the lens when at least one of the number of the pair areas and the total sum of the edge intensities of the pixel areas contained in the pair areas is equal to or more than a first predetermined threshold value.

3. The attachable matter detection apparatus according to claim 2, wherein
    the determination part determines that a partially attached state exists in which the attachable matter is attached partially on the lens when at least one of the number of the pair areas and the total sum of the edge intensities of the pixel areas contained in the pair areas is less than the first predetermined threshold value and equal to or more than a second predetermined threshold value.

4. The attachable matter detection apparatus according to claim 3, wherein
    the determination part determines that an entirely attached state exists in which the attachable matter is attached on an entirety of the lens when at least one of the number of the pair areas and the total sum of the edge intensities of the pixel areas contained in the pair areas is less than the second predetermined threshold value and equal to or more than a third predetermined threshold value.

5. The attachable matter detection apparatus according to claim 1, wherein
    the decision part decides (A) a first representative edge direction using a first angle range as a unit for each of the pixel areas and (B) a second representative edge direction using a second angle range different from the first angle range as a unit for each of the pixel areas, and
    the extractor extracts the two pixel areas that are adjacent to each other as the pair area when at least one of the following conditions is met:
    (i) the respective first representative edge directions of the two pixel areas are opposite to each other; and
    (ii) the respective second representative edge directions of the two pixel areas are opposite to each other.

6. An attachable matter detection method comprising the steps of:
    (a) deciding, by a controller, a representative edge direction using a predetermined angle range as a unit for each pixel area of a plurality of pixel areas of a photographic image photographed by a camera, the representative edge direction being determined for each of the pixel areas based on an edge angle of each pixel contained in the pixel area;
    (b) extracting, by the controller, two of the pixel areas that are adjacent to each other as a pair area among the pixel areas of the photographic image, when the two pixel areas that are adjacent to each other have opposite representative edge directions; and
    (c) determining, by the controller, whether or not there is an attachable matter on a lens of the camera based on at least one of (1) a number of the pair areas extracted by the step (b) and (2) a total sum of edge intensities of the pixel areas contained in the pair areas.

* * * * *